UNITED STATES PATENT OFFICE.

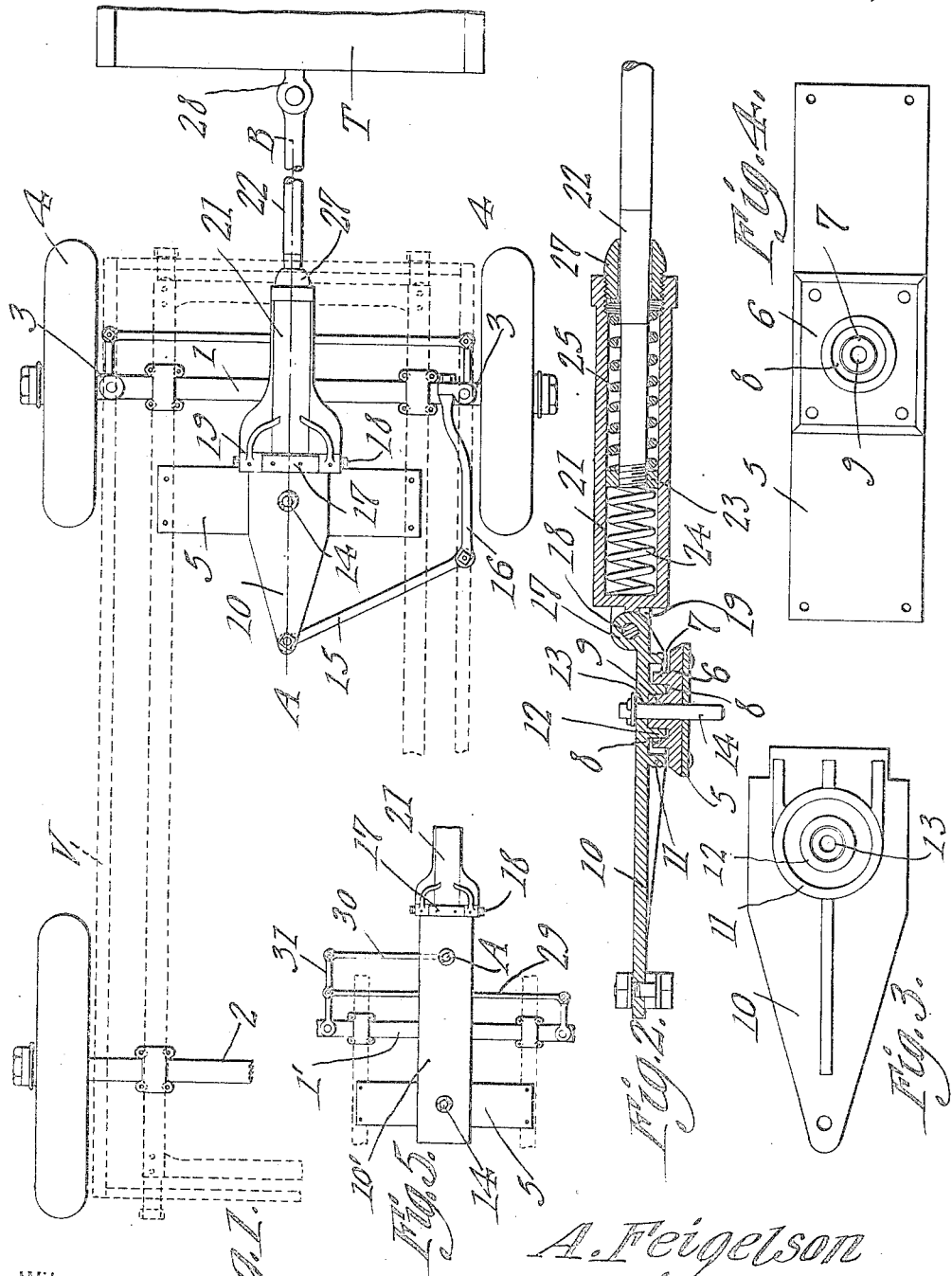

ALEXANDER FEIGELSON, OF BEAUMONT, TEXAS.

TRAILING VEHICLE FOR TRACTORS AND THE LIKE.

1,248,300.  Specification of Letters Patent.  Patented Nov. 27, 1917.

Application filed December 22, 1915. Serial No. 68,243.

*To all whom it may concern:*

Be it known that I, ALEXANDER FEIGELSON, a citizen of the United States, residing at Beaumont, in the county of Jefferson and State of Texas, have invented a new and useful Trailing Vehicle for Tractors and the like, of which the following is a specification.

This invention relates to trailing vehicles especially designed for use in connection with tractors, one of the objects of the invention being to provide towing mechanism whereby the trailing vehicle will be guided accurately in the path of the towing vehicle so that the movement of said trailing vehicle can thus be accurately controlled without danger of collision with objects which might be evaded by the towing vehicle.

A further object is to provide towing means which is simple and compact and will be positively actuated upon the shifting of the towing vehicle relative to the trailing vehicle, thus to properly guide the trailing vehicle.

A further object is to provide towing means including a cushion whereby the trailing vehicle can be easily started without injury and can be stopped quickly without being jolted to an objectionable extent.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a plan view of a portion of a towing vehicle and of the towing mechanism, said mechanism being applied to the running gear of a trailing vehicle indicated by dotted lines.

Fig. 2 is an enlarged section on line A—B Fig. 1.

Fig. 3 is a bottom plan view of one of the members of the towing mechanism.

Fig. 4 is a top plan view of another member of the towing mechanism.

Fig. 5 is a detailed view of a slightly modified form of structure.

Referring to the figures by characters of reference 1 and 2 designate the front and rear axles of the trailing vehicle shown at V, the front axle 1 being similar to the front or steering axle of an automobile in that it is formed with stub shafts 3 carrying the front wheels 4 and these stub shafts being adapted to swing together so as to direct the vehicle in any desired direction. The towing attachment constituting the present invention includes a cross member 5 adapted to be connected to the chassis of the vehicle V and having arranged thereon a bearing block 6 formed with an upstanding boss 7 having a circular groove 8 and a central aperture 9. Mounted on the boss 7 is a swinging plate 10 having depending concentric circular ribs 11 and 12, the inner rib 12 working within the groove 8 while the outer rib 11 extends around the boss 7. This plate 10 has an opening 13 for the reception of a king bolt 14 whereby the plate 10 is free to swing relative to the member 5 without becoming detached therefrom. Plate 10 extends rearwardly beyond the cross member or plate 5 and is connected by a rod 15 to an arm 16 extending rearwardly from one of the stub shafts 3. Thus when the rear end of the plate 10 is swung toward the right, the arm 16 will be swung toward the right and a corresponding movement will be imparted to the two wheels 4 thus to guide the vehicle V toward the left. When plate 10 is swung toward the left, the vehicle will be guided toward the right.

Formed at the front end of the plate 10 is a hinge member 17 carrying a pintle 18 which is engaged by a yoke 19 constituting the other member of the hinge. This yoke is preferably made integral with a sleeve 21 containing a draw bar 22 having a collar 23 at its inner end. A cushioning spring 24 is interposed between this collar and the back end of the sleeve 21, while another cushioning spring 25 is interposed between the collar and a cap 27 engaging the forward end of the sleeve. The two springs serve to hold the collar 23 normally at an intermediate point within the sleeve 21. The front end of the draw bar 22 is adapted to be pivotally connected to a coupling 28 extending from the rear end of a towing vehicle T.

It will be apparent that when the vehicle T starts forward, the collar 23 will place the spring 25 under compression thus to take up shock and cushion the vehicle V.

When the towing vehicle T stops, the spring 24 will be placed under compression, thus relieving the vehicle V and its contents from sudden jolting due to an abrupt stop.

When the towing vehicle T turns to the right the draw bar 22 will swing therewith and will move the rear end of the plate 10 to the left so that said plate will draw through link 15 on arm 16 and cause the wheels 4 to turn toward the right, the parts being so proportioned that these wheels will travel practically in the tracks of the wheels of the towing vehicle. By hingedly connecting the yoke 19 to the plate 10, the vehicle V is free to move upwardly and downwardly relative to the vehicle T, so that in passing over raised places in the roadway or over depressions, the relative up and down movement of the two vehicles will have no effect upon the towing mechanism.

Instead of providing the structure shown in Fig. 1, the modified structure shown in Fig. 5 may be used. In this structure the plate 10' is extended forwardly past the axle 1' and the connecting rod 29 and a link 30 connects the front portion of the plate 10' to an arm 31 to which the connecting rod 29 is secured.

It is to be understood that the coupling covered by this application is to be made in any size desired. The sleeve 21 can be filled with grease so as to facilitate the operation of the parts.

What is claimed is:—

The combination with the running gear of a trailing vehicle, including front wheels mounted to swing about individual axes, of a cross member attached to the chassis of the vehicle to the rear of said wheels, a swinging plate pivotally secured to the cross member, a draw-bar hinged to the plate, cranks shiftable with the wheels, a link connecting the cranks, an extension on one crank, and a link pivotally secured to the extension and the swinging plate.

In testimony that I claim the foregoing as my own, I have hereto affixed my signature in the presence of two witnesses.

ALEXANDER FEIGELSON.

Witnesses:
S. O. HAMPIL,
W. L. BROWN.